സ
3,057,880
EPOXY ESTERS OF 1,2,4-CYCLOPENTANE-TRICARBOXYLIC ACID

John W. Lynn, Charleston, Richard L. Roberts, Milton, and Samuel W. Tinsley, South Charleston, W. Va., assignors to Union Carbide Corporation, a corporation of New York
No Drawing. Filed May 22, 1959, Ser. No. 814,993
2 Claims. (Cl. 260—348)

This invention relates to epoxy esters of polycarboxylic acids having utility as plasticizers and stabilizers for vinyl halide resins, and as monomers for the preparation of valuable resins. In a particular aspect, this invention is directed to epoxy alicyclic esters of 1,2,4-butanetricarboxylic acids.

This invention provides aliphatic triesters of 1,2,4-butanetricarboxylic acids having at least one oxirane-containing alicyclic alcohol radical. The term "aliphatic" as used herein is meant to include both aliphatic and alicyclic structures. By the term "oxirane" is meant the

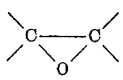

structure. By the term "oxirane-containing alicyclic" radical is meant an alicyclic radical having the carbon atoms of at least one oxirane group incorporated as part of the alicyclic ring to form a bicyclo structure, e.g.,

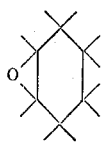

A preferred class of esters of this invention are those corresponding to the general formula

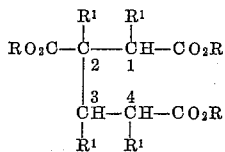

wherein $R^1$ is a member selected from the group consisting of hydrogen and lower alkyl radicals containing between one and about four carbon atoms; wherein R is an aliphatic radical and at least one R is an oxirane-containing alicyclic radical, and the total number of carbon atoms in said R radicals is between seven and about sixty carbon atoms.

Particularly preferred epoxy alicyclic esters corresponding to the above general formula are those in which the aliphatic radical R is a member selected from the group consisting of alkyl radicals containing between one and eighteen carbon atoms, alkenyl radicals containing between two and eighteen carbon atoms, cycloalkyl and cycloalkenyl radicals containing between six and eighteen carbon atoms, and at least one R is a cyclohexene oxide radical and the total number of carbon atoms in said R radicals is between nine and forty-eight carbon atoms. These epoxy esters can contain halogen atoms and are further characterized as being free of acetylenic unsaturation.

The terms "cycloalkyl" and "cycloalkenyl" as used herein include cycloalkylalkyl, cycloalkylalkenyl, cycloalkenylalkyl and cycloalkenylalkenyl radicals. By the term "cyclohexene oxide" is meant the bicyclo structure The previously described general formula is meant to include triesters of 1,2,4-butanetricarboxylic acids which have the number one and number four carbon atoms of the acid moiety connected by a methylene group as illustrated by the following structure

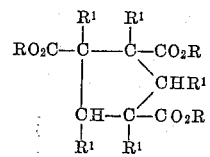

wherein R and $R^1$ are as defined hereinabove.

Illustrative of preferred epoxy alicyclic esters are those in which $R^1$ is methyl, ethyl, propyl, isopropyl, butyl, isobutyl and the like; and R is methyl, vinyl, ethyl, allyl, propyl, isopropyl, butyl, 2-butenyl, isobutyl, tertiary-butyl, amyl, hexyl, 2-hexenyl, 2-ethyl-2-hexenyl, 2-ethylhexyl, heptyl, octyl, 2-octenyl, nonyl, decyl, dodecyl, tridecyl, octadecyl, 9-octadecenyl, cyclopentyl, 2-cyclopentenyl, cyclohexyl, cycloheptyl, cyclohexylmethyl, 1-cyclohexenyl, 2-cyclohexenyl, 3-cyclohexenyl, 4-cyclohexenyl, 3-cyclohexenylmethyl, 1-methyl-3-cyclohexenylmethyl, 4-methyl-3-cyclohexenylmethyl, 6-methyl-3-cyclohexenylmethyl, 3 - cyclohexenylethyl, 3 - cyclohexenylpropyl, 3-cyclohexylpropenyl, and the epoxy derivatives of the foregoing unsaturated radicals wherein the double bond is converted into an oxirane group, e.g., 2,3-epoxypropyl; 3,4-epoxycyclohexylmethyl and the like. Typical preferred epoxy alicyclic esters include 3,4-epoxycyclohexyl bis(methyl) 1,2,4-butanetricarboxylate; bis(3,4-epoxycyclohexylmethyl) vinyl 1,2,4-butanetricarboxylate; 3,4-epoxycyclohexylmethyl bis(2-ethylhexyl) 1,2,4-butanetricarboxylate; 3,4-epoxycyclohexyl bis("oxo" decyl) 1,2,3,4-tetrachloro-1,2,4-butanetricarboxylate; 2,3-epoxycyclohexylmethyl bis(cyclohexylmethyl) 1,2,4-butanetricarboxylate; 2,3-epoxycyclopentyl bis(2-ethylhexyl) 1,2,4-butanetricarboxylate; tris(3,4 - epoxycyclohexyl) 1,2,4-butanetricarboxylate; 4,5 - epoxycyclohexyl bis(9-octadecenyl) 1,2,4-butanetricarboxylate; tris(3,4-epoxycyclohexylmethyl) 1,2,4-butanetricarboxylate; tris(2,3-epoxycyclohexyl) 1,2,4-butanetricarboxylate; tris(3,4-epoxycyclohexylmethyl) 1,2,4-cyclopentanetricarboxylate, and the like.

The epoxy alicyclic esters of this invention are readily prepared by the epoxidation of the corresponding olefinic esters. Preferred epoxidation methods involve the use of peracetic acid or acetaldehyde monoperacetate as the epoxidizing agent.

Epoxidation employing acetaldehyde monoperacetate proceeds as illustrated in the following equation with tris(3-cyclohexenylmethyl) 1,2,4-butanetricarboxylate as the olefinic starting material

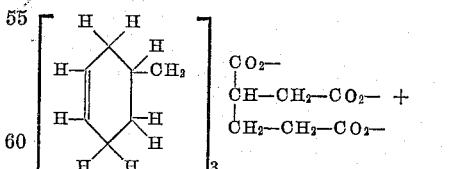

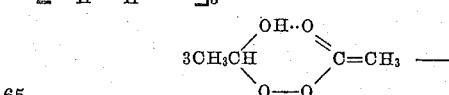

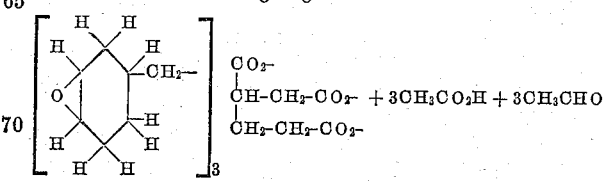

Epoxidation employing peracetic acid proceeds as illustrated in the following equation with 2-cyclohexenyl bis(2-ethyl-2-hexenyl) 1,2,4-butanetricarboxylate as the olefinic starting material

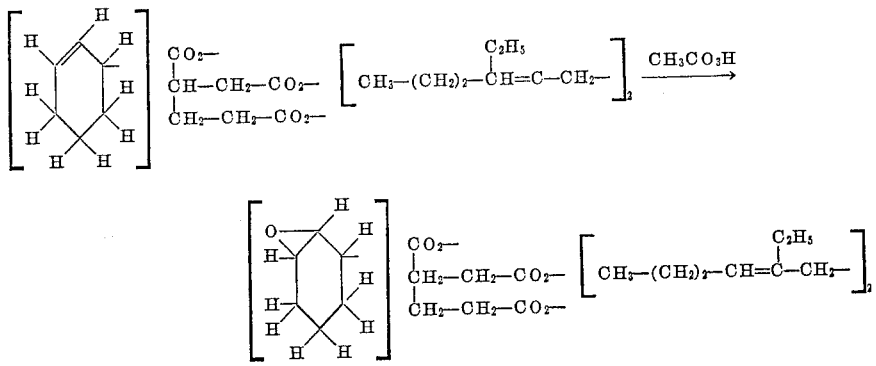

The suitable olefinic ester starting materials which are epoxidized to produce the novel epoxy esters of this invention are readily prepared by conventional esterification and transesterification methods from appropriate aliphatic alcohols and 1,2,4-butanetricarboxylic acids. In one direct esterification method, an alcohol such as 3-cyclohexen-1-methanol is reacted with a polycarboxylic acid such as 1,2,4-butanetricarboxylic acid in the presence of a strong acid catalyst such as para-toluenesulfonic acid with the continuous removal of water as an azeotrope with an entraining agent such as benzene or toluene. In another direct esterification method, the alcohol is reacted with the tricarboxylic acid in the form of its acid halide derivative in the presence of an acid-binding substance such as pyridine. In a transesterification method, an alcohol such as 2-cyclopentenol is reacted with an ester derivative such as triethyl 1,2,4-butanetricarboxylate in the presence of a catalyst such as tetraalkyl titanate with the continuous removal of the replaced alcohol (e.g., ethanol) as a solitary distillation component or as an azeotrope with toluene or a similar entraining agent. The quantities of acid and alcohol reacted may be varied over broad molar ratios but it is usually preferred to employ either stoichiometric quantities of acid and alcohol or a small molar excess of alcohol. For example, for the preparation of an ester which has three similar alcohol moieties, an unsaturated alicyclic alcohol is reacted with the 1,2,4-butanetricarboxylic acid in the ratio of three moles of alcohol for each mole of tricarboxylic acid. In the case of an ester which has dissimilar alcohol moieties, the respective alcohols are employed in the appropriate ratio. For example, when three different alcohols are to be reacted with a 1,2,4-butanetricarboxylic acid, a ratio of one mole of each of the alcohols is employed for each mole of tricarboxylic acid. The alcohols can be reacted individually with the tricarboxylic acid, or the alcohols can be reacted simultaneously as a single mixture with the tricarboxylic acid. In either case, an equilibrium reaction product is formed.

The epoxy alicyclic esters of this invention can also be prepared directly by the interaction of suitable epoxy aliphatic alcohols with 1,2,4-butanetricarboxylic acid derivatives. This method is not preferred because of the various side reactions that can occur.

The class of 1,2,4-butanetricarboxylic acids useful for the production of the novel esters of this invention are available by several preparative routes which are reported in the chemical literature. For example, 1,2,4-butanetricarboxylic acid can be prepared by the Michael condensation of methylenesuccinic acid ester with malonic ester, or by the condensation of acrylonitrile with 1,1,2-ethanetricarboxylic acid. A preferred method of preparing 1,2,4-butanetricarboxylic acids is by the nitric acid oxidation of cyclohexene derivatives corresponding to the formulas

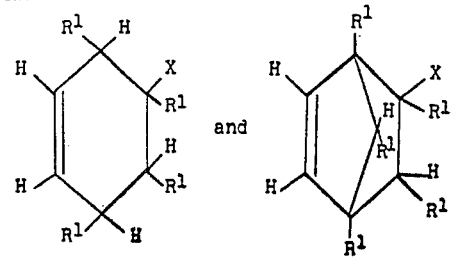

wherein X is a carboxyl group or a group convertible to a carboxyl group such as cyano, keto and amido groups, and $R^1$ is hydrogen or a lower alkyl group containing between one and four carbon atoms. The appropriate cyclohexene derivatives, in turn, are prepared by the Diels-Alder reaction of butadiene and other compounds of the conjugated diene series with mono-olefinic dienophiles having the double bond in a position vinyl to a carboxyl group or a group convertible to a carboxyl group. Suitable dienophiles are illustrated by acrylic acid, crotonic acid, acrylonitrile, alkyl acrylate, alkyl methacrylate, acrylamide, N,N-dialkylcrotonamide and the like. Among the suitable conjugated dienes are included cyclopentadiene, butadiene, piperylene, isoprene and the like.

As mentioned previously, the epoxy alicyclic esters of this invention are useful as plasticizers and as heat and light stabilizers for vinyl halide resins and as monomers for the preparation of valuable resins. For example, tris (2,3 - epoxycyclohexylmethyl) 1,2,4 - butanetricarboxylate is a good plasticizer for poly(vinyl chloride) and has merit as a heat and light stabilizer for this material.

The epoxy alicyclic esters are susceptible to polymerization by reaction of the epoxy groups. The polymerization can proceed by epoxy-epoxy interaction, or by interaction of epoxy groups with other functional groups such as anhydride and active hydrogen groups. Compounds containing active hydrogen groups are illustrated by polycarboxylic acids and polyhydric alcohols and phenols. The epoxy alicyclic esters containing olefinic unsaturation, e.g., bis(2,3-epoxycyclohexyl) vinyl 1-chloro-1,2,4-butanetricarboxylate, have the additional feature of being polymerizable both through the epoxy groups and through the olefin groups. These two dissimilar groups react to form polymers by entirely different reaction mechanisms. The olefinic epoxy ester can be subjected to conditions whereby polymerization occurs through one kind of group to the exclusion of polymerization through the other kind of group. The resulting polymer then can be further polymerized under the proper conditions through the unaffected second kind of group so that a more rigid, tougher resin is formed. For example, an unsaturated epoxy ester of this invention can be copolymerized with a vinyl monomer, such as vinyl chloride, to form a copolymer containing unreacted epoxide groups which could then be cross-linked by treatment with acid or base to induce reaction of the available epoxide groups. Or, on the other hand, an ester of this invention can be copolymerized with a monomer such as ethylene oxide or ethylenediamine to form a copolymer which contains double bonds capable of cross-linking by treatment with a peroxide or by heat at an elevated temperature. The dissimilarity of the polymer-forming epoxy and olefin groups enables control over polymer formation so as to produce polymers having a great variety of properties.

The particularly preferred epoxy alicyclic esters of this invention, i.e., those containing at least one cyclohexene oxide group, have outstanding utility because of extraordinary reactivity of cyclohexene oxide groups with carboxylic acids. Based on this unique reactivity, the cyclohexene oxide esters are valuable in the preparation of ester or varnish-type coatings. It has been discovered that epoxy alicyclic esters of this invention containing at least two cyclohexene oxide groups can be interacted with various fatty acids to form cyclohexene oxide-fatty acid esters which can be applied as protective coatings having properties superior to the coatings prepared from conventional epoxy materials. For example, tris (3,4-epoxycyclohexylmethyl) 1,2,4-butanetricarboxylate can be reacted with an aliphatic monocarboxylic acid such as dehydrated castor oil acid in an amount sufficient to provide between about 0.3 and 0.7 carboxyl equivalents per epoxy equivalent of said polyepoxide and the resulting cyclohexene oxide-fatty acid ester can be applied and cured on a substrate to form a coating having outstanding caustic and water resistance, toughness, flexibility, excellent color retention on exposure to ultraviolet light and excellent resistance to the deleterious effects of outdoor exposure. Conventional drying-oil esters based on commercial epoxides are relatively expensive and generally exhibit poor color retention on exposure to ultraviolet light, severe chalking on exposure to outdoor conditions and poor solubility in inexpensive solvents.

The following examples will serve to illustrate specific embodiments of the invention.

*Example 1*

A solution (281 grams) of 25.7 percent peracetic acid in ethyl acetate was fed dropwise to 3-cyclohexenylmethyl bis(2-ethylhexyl) 1,2,4-butanetricarboxylyate (456 grams) at a temperature around 50° C. over a period of one hour. After a reaction time of an additional five hours at 50° C., analysis of the reaction mixture indicated that a stoichiometric amount of peracetic acid had been consumed. The reaction mixture was stripped of ethyl acetate, acetic acid and excess peracetic acid by passing it through a steam-heated evaporator, first at 45 to 50 millimeters of mercury pressure, then again at 4 to 5 millimeters of mercury pressure, and finally at 1 to 2 millimeters of mercury pressure. 3,4-epoxycyclohexylmethyl bis(2-ethylhexyl) 1,2,4-butanetricarboxylate (465 grams) was obtained as a residual product containing 2.75 percent oxirane oxygen (91 percent purity).

*Example 2*

A solution (208 grams) of 25.5 percent peracetic acid in ethyl acetate was added dropwise to bis(3-cyclohexenylmethyl) 2-ethylhexyl 1,2,4-butanetricarboxylate (156 grams) at a temperature of 46° C. over a period of thirty minutes. After an additional four hours of reaction time, volatile materials were removed from the mixture by passing it through a steam-heated evaporator in the same manner as in Example 1. Bis(3,4-epoxycyclohexylmethyl) 2-ethylhexyl 1,2,4-butanetricarboxylate (161 grams) was recovered as a residual product which contained 5.17 percent oxirane oxygen (84 percent purity).

*Example 3*

A solution (251 grams) of 25.2 percent peracetic acid in ethyl acetate was added dropwise to 3-cyclohexenylmethyl bis("oxo" decyl) [1] 1,2,4-butanetricarboxylate (448 grams) at a temperature of 50° C. to 55° C. over a period of forty-five minutes. After an additional four hours of reaction time at 50° C. to 55° C., volatile materials were stripped from the reaction mixture as in the preceding examples. 3,4-epoxycyclohexylmethyl bis("oxo" decyl) 1,2,4-butanetricarboxylate was obtained as a residual product containing 2.4 percent oxirane oxygen (90 percent purity).

*Example 4*

A solution (565 grams) of 26.9 percent peracetic acid in ethyl acetate was added dropwise to tris(3-cyclohexenylmethyl) 1,2,4-butanetricarboxylate (337 grams) at a temperature of 50° C. over a period of one hundred five minutes. After an additional two hours of reaction time at 50° C., volatile materials were removed from the reaction mixture as in the preceding examples. Tris(3,4-epoxycyclohexylmethyl) 1,2,4-butanetricarboxylate (396 grams) was obtained as a residual product containing 6.98 percent oxirane oxygen.

*Example 5*

A solution (297 grams) of 27.1 percent peracetic acid in ethyl acetate was added dropwise to bis(3-cyclohexenylmethyl) vinyl 1,2,4 - butanetricarboxylate (214 grams) at a temperature of 30° C. to 40° C. over a period of eighty minutes. After an additional four hours and twenty minutes of reaction time, volatile materials were removed from the reaction mixture as in the preceding examples. Bis(3,4-epoxycyclohexylmethyl) vinyl 1,2,4-butanetricarboxylate (180 grams) was isolated as a residual product containing 6.2 percent oxirane oxygen.

*Example 6*

A 20 to 30 percent solution of peracetic acid in ethyl acetate, containing approximately 3.3 moles of peracetic acid, is fed dropwise to tris(3-cyclohexenylmethyl) 1,2,4-cyclopentanetricarboxylate (473 grams) at a temperature of 50° C. over a period of approximately one hour. After an additional reaction period of one to six hours, when titration of the excess peracetic acid indicates that the reaction is essentially complete, the reaction mixture is stripped of ethyl acetate, acetic acid and excess peracetic acid by passing it through a steam-heated evaporator in the same manner as in the preceding examples. Tris-(3,4-epoxycyclohexylmethyl) 1,2,4 - cyclopentanetricarboxylate is obtained as a residual product.

*Example 7*

A solution of peracetic acid (20 to 30 percent by weight) in ethyl acetate, containing approximately 1.1 moles of peracetic acid, is fed dropwise over a period of about one hour to one mole of 2-cyclopentenyl bis(2-ethylhexyl) 1,2,4-butanetricarboxylate, at a reaction temperature of 50° C. The reaction mixture is held at 50° C. for an additional one to six hours until analysis indicates that a stoichiometric amount of peracetic acid has been consumed. The reaction mixture is stripped of ethyl acetate, acetic acid and excess peracetic acid by passing it through a steam-heated evaporator as in the preceding examples. 2-3-epoxycyclopentyl bis(2-ethylhexyl) 1,2,4-butanetricarboxylate is obtained as a residual product.

---

[1] Alcohol prepared in the "oxo" process by reaction of tripropylene with carbon monoxide and hydrogen.

What is claimed is:
1. A compound of the formula

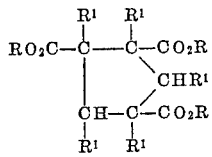

wherein $R^1$ is a member selected from the group consisting of hydrogen and lower alkyl radicals having between one and about four carbon atoms; wherein R is a radical selected from the group consisting of alkyl, alkenyl, cycloalkyl, cycloalkenyl, 2,3-epoxycyclohexyl, 2,3-epoxycyclohexylmethyl, 3,4-epoxycyclohexyl, and 3,4-epoxycyclohexylmethyl and at least two R radicals are selected from the group consisting of 2,3-epoxycyclohexyl, 2,3-epoxycyclohexylmethyl, 3,4-epoxycyclohexyl and 3,4-epoxycyclohexylmethyl and the total number of carbon atoms in said R radicals is between seven and about sixty carbon atoms.

2. Tris(3,4-epoxycyclohexylmethyl) 1,2,4 - cyclopentanetricarboxylate.

References Cited in the file of this patent
UNITED STATES PATENTS

| | | |
|---|---|---|
| 2,476,992 | Shokal et al. | July 19, 1949 |
| 2,935,492 | Newey | May 3, 1960 |

FOREIGN PATENTS

| | | |
|---|---|---|
| 559,078 | Canada | June 17, 1958 |